(12) United States Patent
Dunneback

(10) Patent No.: US 6,382,707 B1
(45) Date of Patent: May 7, 2002

(54) REINFORCED DOOR ASSEMBLY FOR A MOTOR VEHICLE

(75) Inventor: Mark R Dunneback, Macomb Township, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/685,510

(22) Filed: Oct. 9, 2000

(51) Int. Cl.[7] .................................................. B60J 5/04
(52) U.S. Cl. ...................... 296/146.6; 296/188; 296/189
(58) Field of Search .............................. 296/146.6, 188, 296/189; 49/502, 501; 52/731.6

(56) References Cited

U.S. PATENT DOCUMENTS

| | | | |
|---|---|---|---|
| 4,708,390 A | * 11/1987 | Palentyn et al. ...... | 296/146.6 X |
| 5,370,437 A | * 12/1994 | Alberda ................ | 296/146.6 |
| 5,404,690 A | * 4/1995 | Hanf .................... | 296/146.6 X |
| 5,580,120 A | * 12/1996 | Nees et al. ............ | 296/146.6 |
| 5,800,007 A | * 9/1998 | Cho ..................... | 296/146.6 |
| 5,868,456 A | * 2/1999 | Kowalski et al. ....... | 296/146.6 |
| 6,065,797 A | * 5/2000 | Shirasaka .............. | 296/146.6 |

FOREIGN PATENT DOCUMENTS

| | | | |
|---|---|---|---|
| DE | 4307079 | * 7/1992 | ............... 296/146.6 |
| EP | 4929995 | * 7/1992 | ............... 296/146.6 |

* cited by examiner

*Primary Examiner*—Joseph D. Pape
(74) *Attorney, Agent, or Firm*—Mark P. Calcaterra

(57) ABSTRACT

A reinforced door assembly for a motor vehicle including a vehicle frame. The reinforced door assembly includes a door frame and two reinforcement brackets. The reinforcement brackets incorporate a tubular reinforcement beam which extends the length of the reinforced door assembly. The end of the reinforcement beam which incorporates the reinforcement bracket nearest a latch mechanism of the reinforced door is formed to include a reverse taper cut and extends substantially the entire length of the reinforcement bracket. By extending the entire length of the reinforcement bracket, the reinforcement beam overlaps the latch mechanism of the reinforced door.

4 Claims, 5 Drawing Sheets

REINFORCED DOOR ASSEMBLY FOR A MOTOR VEHICLE

BACKGROUND OF THE INVENTION

1. Technical Field

The present invention generally relates to motor vehicles. More particularly, the present invention relates to a reinforced door assembly for a motor vehicle.

2. Discussion

Structural reinforcements are commonly employed within motor vehicle doors to provide an increased level of protection against intrusion into the passenger compartment during a side impact collision. Such structural reinforcements are commonly referred to as "intrusion beams". Common forms of known intrusion beams range from tubular members which horizontally extend between inner and outer panels of a vehicle door to metal stampings welded to the frame of the door.

One specific structural reinforcement for a vehicle door is shown and described in commonly assigned U.S. Pat. No. 5,544,930 to Stedman. This patent describes a structural reinforcement having an energy absorbing tubular bar supported by first and second brackets. The tubular bar extends substantially across a length of the vehicle door approximately parallel to a lower edge of the door. The tubular bar has a first end and a second end and a longitudinal axis passing through the first and second ends. The first bracket retains the first end of the tubular bar such that there is a predetermined amount of rotational float between the first bracket and the first end of the bar. The second bracket has a seat portion receiving and affixed to the second end of the bar. U.S. Pat. No. 5,544,930 is incorporated by reference as if fully set forth herein.

The arrangement shown and described in U.S. Pat. No. 5,544,930 and many other prior known arrangements have proven to be commercially acceptable for their intended applications. However, it remains desirable to design an improved intrusion beam which allows for an even more controlled and predictable load distribution of energy during a side impact event while increasing the robustness of an interface between an intrusion beam, a reinforcement bracket, a latch, a striker, and a B-pillar.

SUMMARY OF THE INVENTION

It is a principal object of the present invention to provide an apparatus for reinforcing a vehicle door which functions to reduce intrusion into the passenger compartment in the event of a side impact collision.

It is a related object of the present invention to provide a vehicle door assembly which improves the effectiveness of an intrusion beam by increasing the robustness of an interface between the intrusion beam, a reinforcement bracket, a latch, a striker, and a B-pillar.

It is another object of the present invention to provide a reinforced door for a motor vehicle which more effectively provides for a controlled and predictable load distribution during a side impact event while allowing manufacturers to better optimize material usage. Such a design maintains necessary performance characteristics of the intrusion beam while reducing material and development costs.

In one form, the present invention provides a reinforced door assembly for a motor vehicle including a vehicle frame. The reinforced door assembly includes a door frame and two reinforcement brackets. The reinforcement brackets incorporate a tubular reinforcement beam which extends the length of the reinforced door assembly. The end of the reinforcement beam which incorporates the reinforcement bracket nearest a latch mechanism of the reinforced door is formed to include a reverse taper cut that extends substantially the entire length of the reinforcement bracket. By extending the entire length of the reinforcement bracket, the reinforcement beam overlaps the latch mechanism of the reinforced door. Due in part to its overlap of the latch mechanism and its reverse taper cut configuration, the reinforcement beam of the present invention provides for more controlled and predictable load distribution of energy during a side impact event. In addition, the reinforcement beam provides improved robustness of an interface between the tubular reinforcement beam, the reinforcement bracket, the latch, a striker, and a B-pillar.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
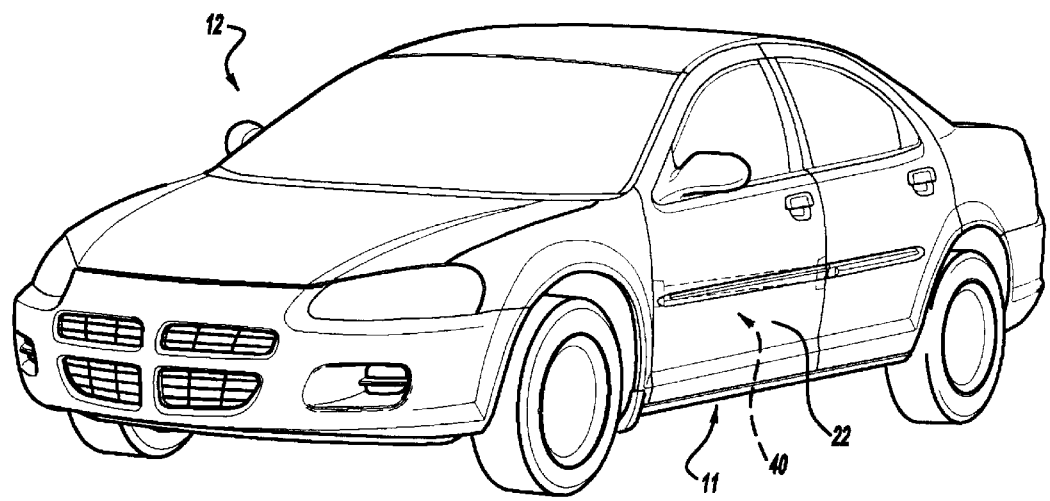
FIG. 1 is a perspective view of an exemplary motor vehicle shown incorporating a reinforced door assembly constructed in accordance with the teachings of a preferred embodiment of the present invention.
Figure 2:
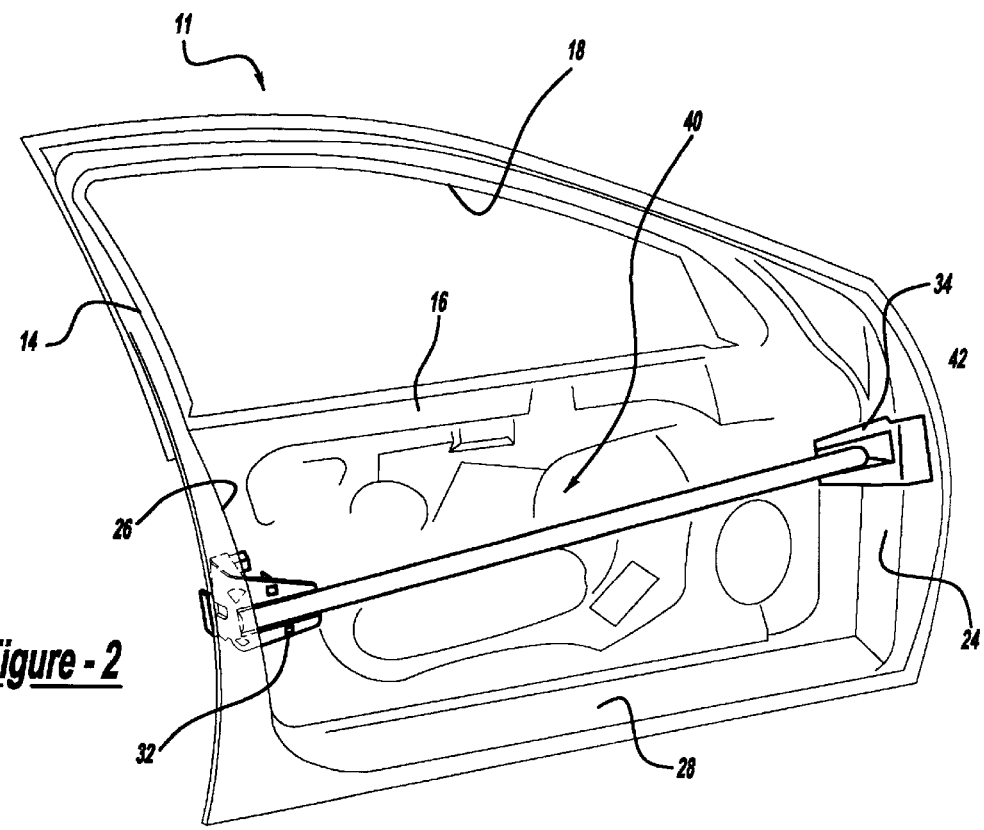
FIG. 2 is an enlarged view of a sub-assembly of the reinforced door assembly of FIG. 1.
Figure 3:
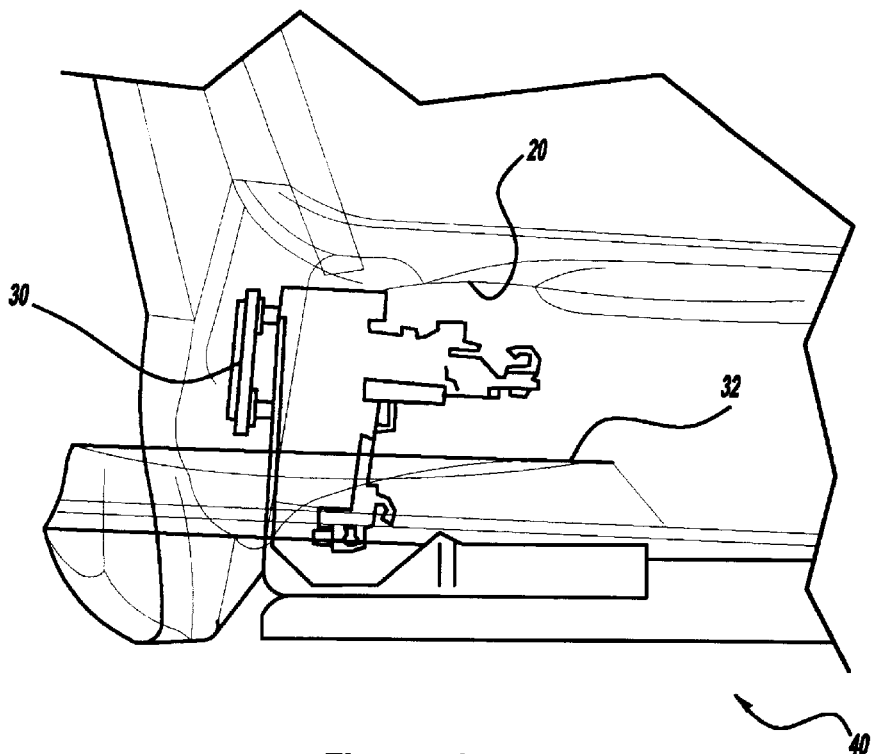
FIG. 3 is a further enlarged view illustrating the cooperation between the striker, latch, reinforcement bracket, and reinforcement beam of FIG. 2.
Figure 4:
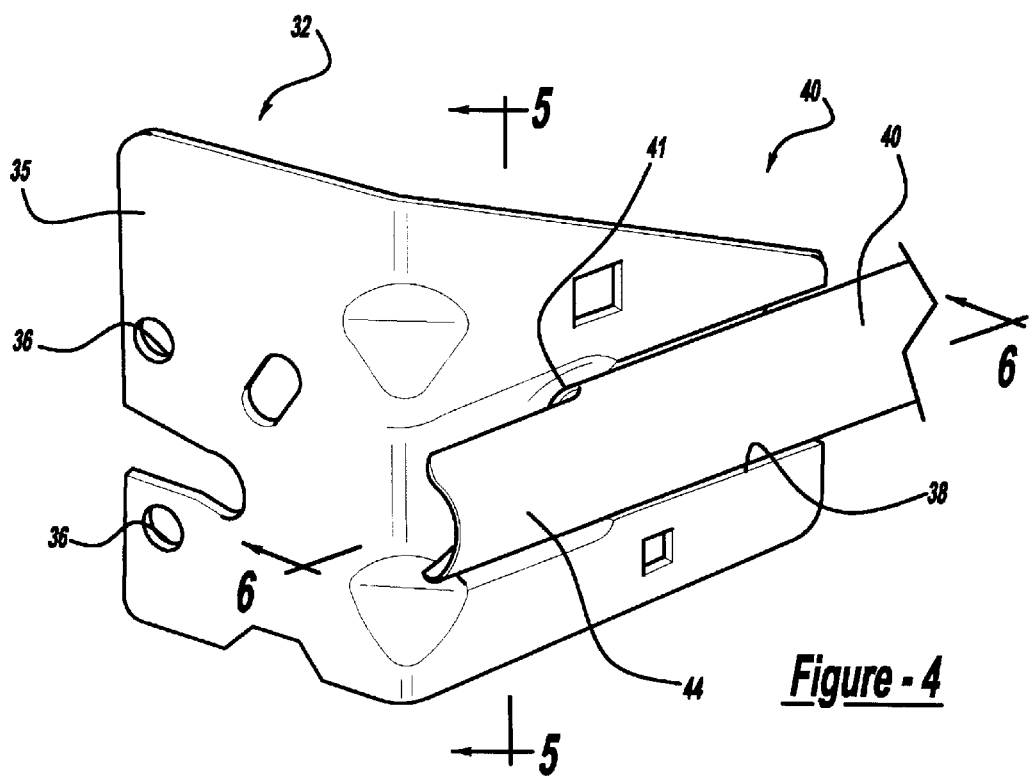
FIG. 4 is an enlarged perspective view of the interface between a reinforcement bracket and one end of the reinforcement beam of FIGS. 2 and 3 illustrated removed from the sub-assembly for purposes of illustration.

With reference to FIG. 1 of the drawings, a reinforced vehicle door constructed in accordance with the teachings of a preferred embodiment of the present invention is generally identified with reference numeral 11. The reinforced vehicle door assembly 11 is shown to include an intrusion beam assembly and is further shown operatively installed within an exemplary motor vehicle 12. However, it will become apparent to those skilled in the art that the teachings of the present invention have applicability to a wide range of vehicles.

With continued reference to FIG. 1 and additional reference to FIGS. 2 through 5, the reinforced vehicle door assembly 11 of the present invention will now be described in greater detail. The reinforced vehicle door assembly 11 is illustrated to conventionally include a door frame 14 with an inner panel 16. In the exemplary embodiment illustrated, the inner panel 16 is conventionally formed by stamping a sheet of metal to define a shape corresponding to that of an opening (not specifically shown) in the vehicle 12 in which it is incorporated. The inner panel 16 includes a lower generally rectangular portion and an upper, generally trapezoidal portion. The upper portion generally defines a window opening 18. The intersection of the upper and lower portions is commonly referred to as the belt-line. Below the belt-line, the inner panel 16 is typically provided with a plurality of openings for access to internal mechanisms such as window regulators (not shown) and a door latch 20 which are operatively disposed within the vehicle door assembly 11 between the inner panel 16 and an outer panel 22.

The door frame 14 is preferably formed to further include a front shut face or hinge shut face 24 and a rear shut face or latch shut face 26 connected by a bottom flange member 28. The hinge and latch shut faces 24 and 26 each intersect and are integrally formed with the inner panel 16. The hinge and latch shut faces 24 and 26 are disposed generally perpendicular to the inner panel 16.

The latch shut face 26 carries the latch 20 for engaging a striker 30. The latch 20 is fastened to an interior of the latch shut face 26 through suitable fasteners. The striker 30 is fastened to a B-pillar of the motor vehicle 20 in any manner well known in the art. The latch 20 conventionally cooperates with the striker 30 to secure the motor vehicle door assembly 11 to a frame of the motor vehicle 12.

The reinforced vehicle door assembly 11 further includes a first reinforcement bracket 32 and a second reinforcement bracket 34. The first reinforcement bracket 32 is attached to the latch shut face 26 and the second reinforcement bracket 34 is attached to the hinge shut face 24. The first reinforcement bracket 32 includes a first generally planar portion 35. The first generally planar portion 35 defines a plurality of holes 36 for receiving fasteners which engage the latch shut face 26 through corresponding holes therein (not shown). The fasteners are received in apertures (not shown) of the latch 20.

The first reinforcement bracket 32 further includes a second generally planar portion 37. The first generally planar portion 35 extends rearwardly from the second generally planar portion 37 in a generally perpendicular orientation. The second generally planar portion 37 defines a recessed receptacle 38 for receiving an end of a reinforcement beam 40. In one embodiment the reinforcement beam 40 is a substantially hollow tubular beam. A first end of reinforcement beam 40 is disposed within the recessed receptacle 38 and is welded or otherwise suitably fastened to the recessed receptacle 38. The reinforcement beam 40 preferably extends the entire length of the first reinforcement bracket 32.

The second reinforcement bracket 34 attaches to an inner side of hinge shut face 24 and is similarly formed to include a recessed receptacle 42 to receive a second end of the reinforcement beam 40. The second end of the reinforcement beam 40 is disposed within the recessed receptacle 42 and is welded or otherwise suitably fastened to the recessed receptacle 42. The second reinforcement bracket 34 welded or suitably attached to the inner side of the hinge shut face 24. The second reinforcement bracket 34 is further secured into position by being securely disposed between the inner panel 16 and an outer panel (not shown) of the door frame 14.

Figure 5:
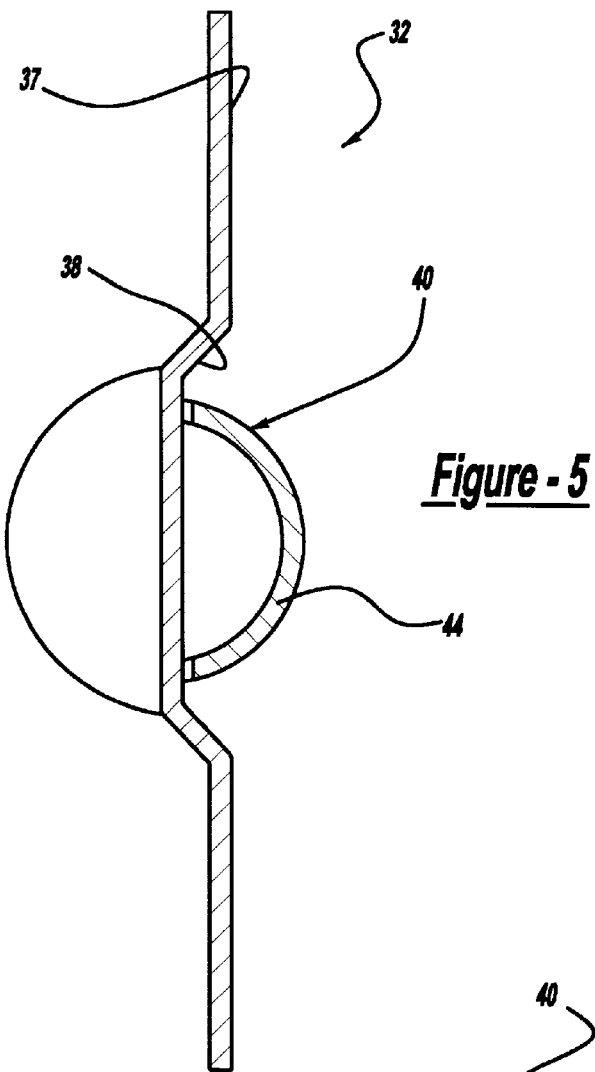
FIG. 5 is a cross section taken along the line 5—5 of FIG. 4.
Figure 6:
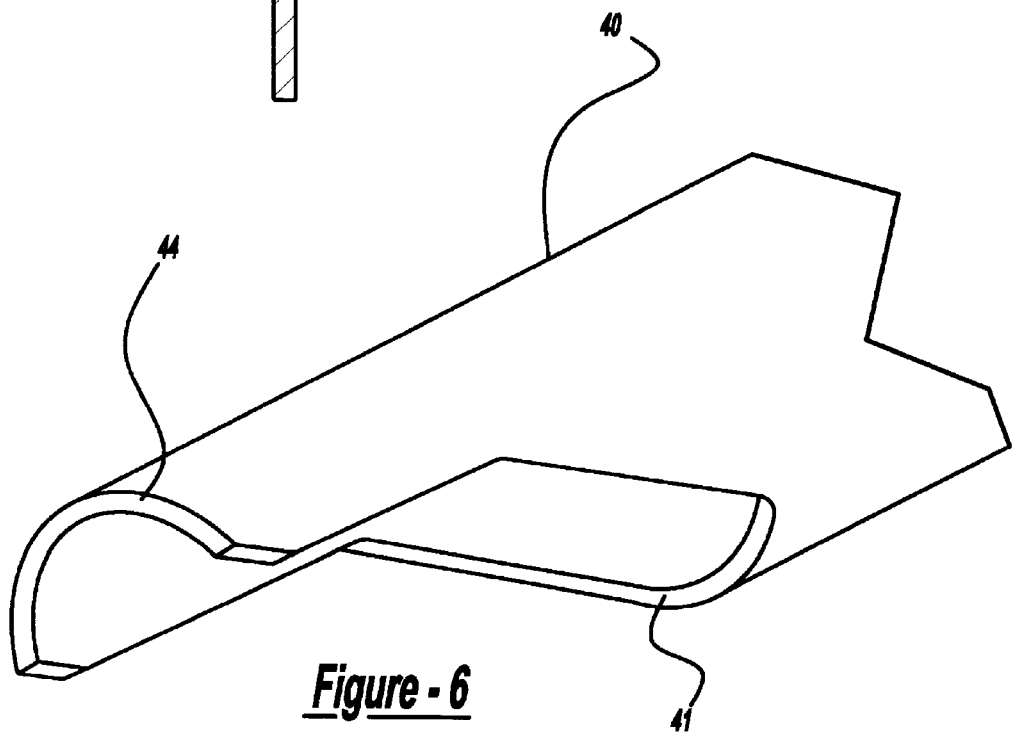
FIG. 6 is an enlarged perspective of the reinforcement beam illustrating the reverse taper cut.

In the preferred embodiment, the end of the reinforcement beam 40 terminating at the first reinforcement bracket 32 is formed to include a reverse taper cut 41. However, in certain applications it may be desirable to form both ends of the reinforcement beam 40 to include a reverse taper cut. Explaining the reverse taper cut configuration of the preferred embodiment further, at approximately the mid-point of the recessed receptacle 38 of the first reinforcement bracket 32, the reinforcement beam 40 forms only a half circle in section as seen in FIG. 5. Explaining further, at the point on the first reinforcement bracket 32 where the reinforcement beam 40 terminates, the reinforcement beam 40 only consists of an outer half cylinder 44. The outer half cylinder 44 is not fastened to the recessed receptacle 38, but is rather suspended or cantilevered adjacent to the recessed receptacle 38. The outer half cylinder 44 is not cut in a 90° fashion but rather is taper cut at 41 as particularly illustrated in FIG. 6. The taper cut is preferably performed with a suitable cutting laser which allows for multiple reinforcement beams to be taper cut in a back to back fashion.

By extending the reinforcement beam 40 the entire length of the first reinforcement bracket 32, the outer half cylinder 44 of the reinforcement beam 40 effectively overlaps the latch 20 and approximately forms a right angle with the latch shut face 26. This overlap enhances the performance of the reinforcement beam 40 by improving the robustness of the interface between the reinforcement beam 40, the reinforcement bracket 32, the latch 20, the striker 30, and the B-pillar interface.

The present invention allows for a more controlled and predictable load distribution of energy during a side impact event. Many reinforcement beam designs have not allowed for such controlled and predictable measurements. In previous designs, the amount of energy deflected by a stabilization bar was not always consistent with the load energy experienced during impact. While such prior designs may have functioned satisfactorily, additional material, bracketing or both have been required.

Figure 7:
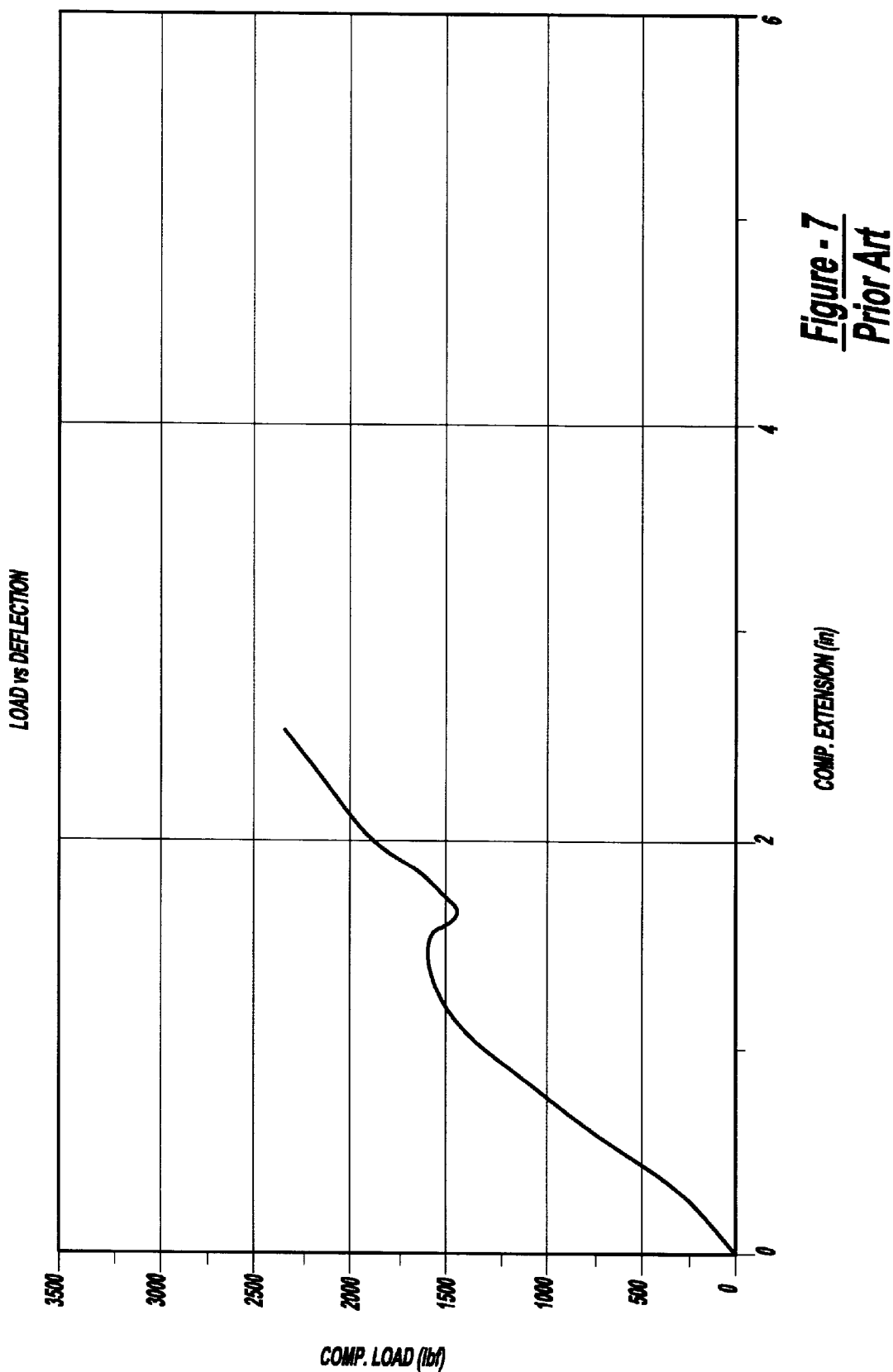
FIG. 7 is a graph illustrating load distribution of energy of a prior art reinforcement beam during a side impact event
Figure 8:
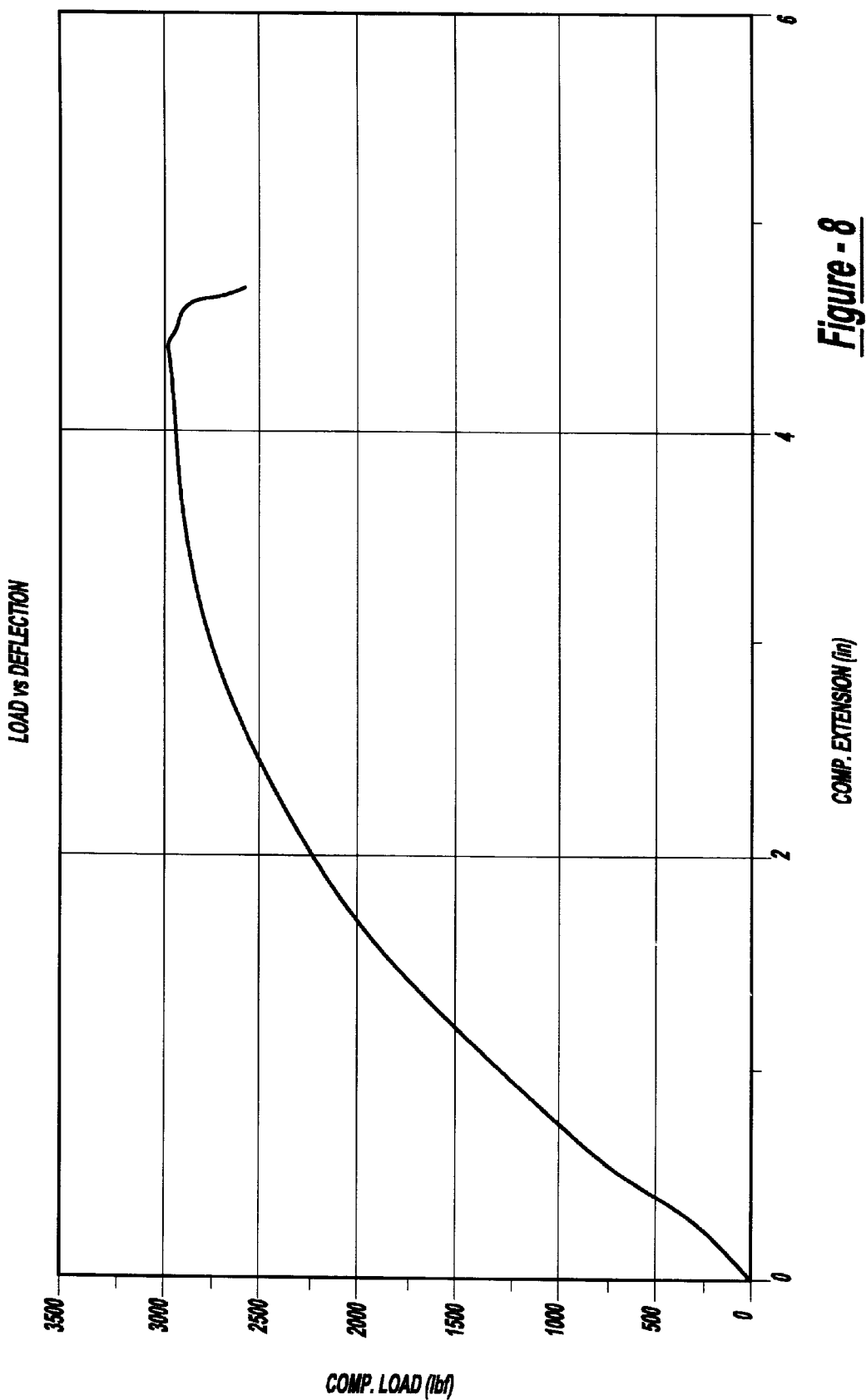
FIG. 8 is a graph illustrating the predictable load distribution of energy of the reinforcement beam of the present invention during a side impact event.

For example, FIG. 7 illustrates a force versus deflection curve for a typical prior art beam. When 1500 pounds of force is applied to a prior art reinforcement beam, the exact extension distance can not be exactly determined. All that can be determined is that the distance is somewhere between one and two inches. In contrast, the present design allows engineers to predict exactly how much energy will be deflected by a reinforcement beam designed of a particular material. As seen in FIG. 8, 1500 pounds of force applied will result in an extension distance of approximately one inch. Variable extension readings are not produced. Consequently, the present design allows engineers to accurately determine the amount of materials required to produce a reinforcement beam which is able to deflect a predetermined amount of energy.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed:

1. A reinforced door assembly for a motor vehicle, the motor vehicle including a vehicle frame, the reinforced door assembly comprising:

a door frame;

a latch assembly having a latch for engaging a striker;

a first reinforcement bracket attached to a first shut face of the door frame and a second reinforcement bracket attached to a second shut face of the door frame;

a reinforcement beam extending from the first reinforcement bracket to the second reinforcement bracket, the reinforcement beam including a first end having an incomplete circular cross section, wherein the reinforcement beam extends substantially the full horizontal length of the first reinforcement bracket.

2. A reinforced door assembly for a motor vehicle, the motor vehicle including a vehicle frame, the reinforced door assembly comprising:

a door frame;

a latch assembly having a latch for engaging a striker;

a first reinforcement bracket attached to a first shut face of the door frame and a second reinforcement bracket attached to a second shut face of the door frame;

a reinforcement beam extending from the first reinforcement bracket to the second reinforcement bracket, the reinforcement beam including a first end having an incomplete circular cross section, wherein the reinforcement beam extends substantially the entire length of the first reinforcement bracket so as to overlap the latch.

3. The door assembly of claim 2, wherein the portion of the reinforcement beam which overlaps the latch defines only a portion of a cylinder such that only an outer hemisphere of the reinforcement beam covers the latch.

4. An intrusion beam assembly for a motor vehicle, the intrusion beam assembly comprising:

a reinforcement bean having a first end with an incomplete circular cross section, a first reinforcement bracket, the reinforcement beam attached to a recessed receptacle of the first reinforcement bracket, wherein the intrusion beam extends substantially the full length of the first reinforcement bracket.

* * * * *